(12) United States Patent
Cohen

(10) Patent No.: US 6,494,190 B1
(45) Date of Patent: Dec. 17, 2002

(54) BI-FUEL GASOLINE AND LOW PRESSURE GAS FUEL SYSTEM AND METHOD OF OPERATION

(75) Inventor: James H. Cohen, Virginia Beach, VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 122 days.

(21) Appl. No.: 09/632,791

(22) Filed: Aug. 4, 2000

(51) Int. Cl.[7] .............................................. F02M 21/02
(52) U.S. Cl. ........................................ 123/525; 123/575
(58) Field of Search .................... 123/525, 575, 123/1 A, 478

(56) References Cited

U.S. PATENT DOCUMENTS

| | | | |
|---|---|---|---|
| 4,333,739 A | * 6/1982 | Neves | 123/1 A |
| 4,596,210 A | * 6/1986 | Schmidtke | 123/1 A |
| 4,693,227 A | 9/1987 | Satou | |
| 4,922,862 A | 5/1990 | Casacci | |
| 5,315,054 A | * 5/1994 | Teel | 585/14 |
| 5,628,294 A | 5/1997 | Krieckaert et al. | |
| 5,735,253 A | 4/1998 | Perotto et al. | |
| 5,816,224 A | * 10/1998 | Welsh et al. | 123/525 |
| 5,887,799 A | 3/1999 | Smith | |
| 5,983,869 A | * 11/1999 | Cooke et al. | 123/514 |
| 6,035,837 A | 3/2000 | Cohen et al. | 123/575 |

* cited by examiner

Primary Examiner—Noah P. Kamen

(57) ABSTRACT

A fuel system for an internal combustion engine having a plurality of combustion chambers is disclosed. The fuel system includes a liquid fuel and a low pressurize gaseous fuel. The fuel system further includes a fuel tank, with the liquid fuel and the low pressurize gaseous fuel forming a fuel mixture in the fuel tank. A single fuel supply rail is fluidly connected to the fuel tank and a fuel injector fluidly connects the single fuel supply rail to each of the plurality of combustion chambers. The fuel mixture is provided to each fuel injector for injection into each respective combustion chamber. A method of operating the fuel system is also disclosed.

14 Claims, 1 Drawing Sheet

BI-FUEL GASOLINE AND LOW PRESSURE GAS FUEL SYSTEM AND METHOD OF OPERATION

FIELD OF THE INVENTION

The current invention relates to fuel systems which employ two different types of fuels supplied in a common fuel rail to common fuel injectors.

BACKGROUND OF INVENTION

Bi-fuel systems have been used in engines of motor vehicles to provide alternative power supplies to the engine. The fuels used are typically gasoline and a low pressure gas, such as propane. Benefits of this type of system include the ability to select a fuel which produces generally a lower amount of unwanted emissions but is generally less readily available, such as propane, or a more readily available fuel but which produces higher amounts of unwanted emissions, such as gasoline. Most fuel injectors which have been designed for use with gasoline are not designed for use with a low pressure gas. Therefore, to use a bi-fuel system, separate fuel injectors for each of the two types of fuels must be installed for each combustion chamber of the engine. Each set of fuel injectors must be supplied by a separate fuel rail. As a result, when the low pressure gas supplies the fuel, the gasoline injectors are not flowing any fuel. Stagnant fuel inside the gasoline injectors is exposed to elevated temperatures for extended period of time, which can aggravate deposit formations and negatively affect emissions.

Additionally, the requirement for separate fuel injectors, as well as separate fuel rails adds to the cost and weight of the fuel system, making the bi-fuel system a less attractive alternative to a single fuel system.

It would be beneficial to develop a fuel system in which a liquid fuel, a low pressure gas fuel, or a mixture of the two types of fuels can be used in a single set of fuel injectors which are supplied by a common fuel rail. Such a system would allow either the liquid, the gas, or the mixture to be used in a single fuel system, reducing the weight and cost of such a fuel system.

BRIEF SUMMARY OF THE INVENTION

A fuel system for an internal combustion engine is provided. The engine has a plurality of combustion chambers. The fuel system comprises a liquid fuel and a low pressurize gaseous fuel. The fuel system further comprises a fuel tank, with the liquid fuel and the low pressurize gaseous fuel forming a fuel mixture in the fuel tank. A single fuel supply rail is fluidly connected to the fuel tank and a fuel injector fluidly connects the single fuel supply rail to each of the plurality of combustion chambers. The fuel mixture is provided to each fuel injector for injection into each respective combustion chamber.

A fuel system for an internal combustion engine having a plurality of combustion chambers is also provided. The fuel system comprises a fuel tank adapted to receive a mixture of a liquid fuel and a low pressurize gaseous fuel. A single fuel supply rail is fluidly connected to the fuel tank. A fuel injector fluidly connects the single fuel supply rail to each of the plurality of combustion chambers.

A method of operating a bi-fuel system is also provide. The method comprises supplying the mixture to a single fuel supply rail; directing the mixture through the single fuel supply rail to a plurality of fuel injectors; directing at least part of the mixture into each of the plurality of fuel injectors; directing a remaining part of the mixture to a single fuel return rail; and returning the remaining part of the mixture to the common tank.

BRIEF DESCRIPTION OF THE DRAWING

The accompanying drawing, which is incorporated herein and constitute part of this specification, illustrates the presently preferred embodiment of the invention, and, together with the general description given above and the detailed description given below, serves to explain the features of the invention. In the drawing.

DETAILED DESCRIPTION OF THE PREFERRED EMBODIMENT

Figure 1:
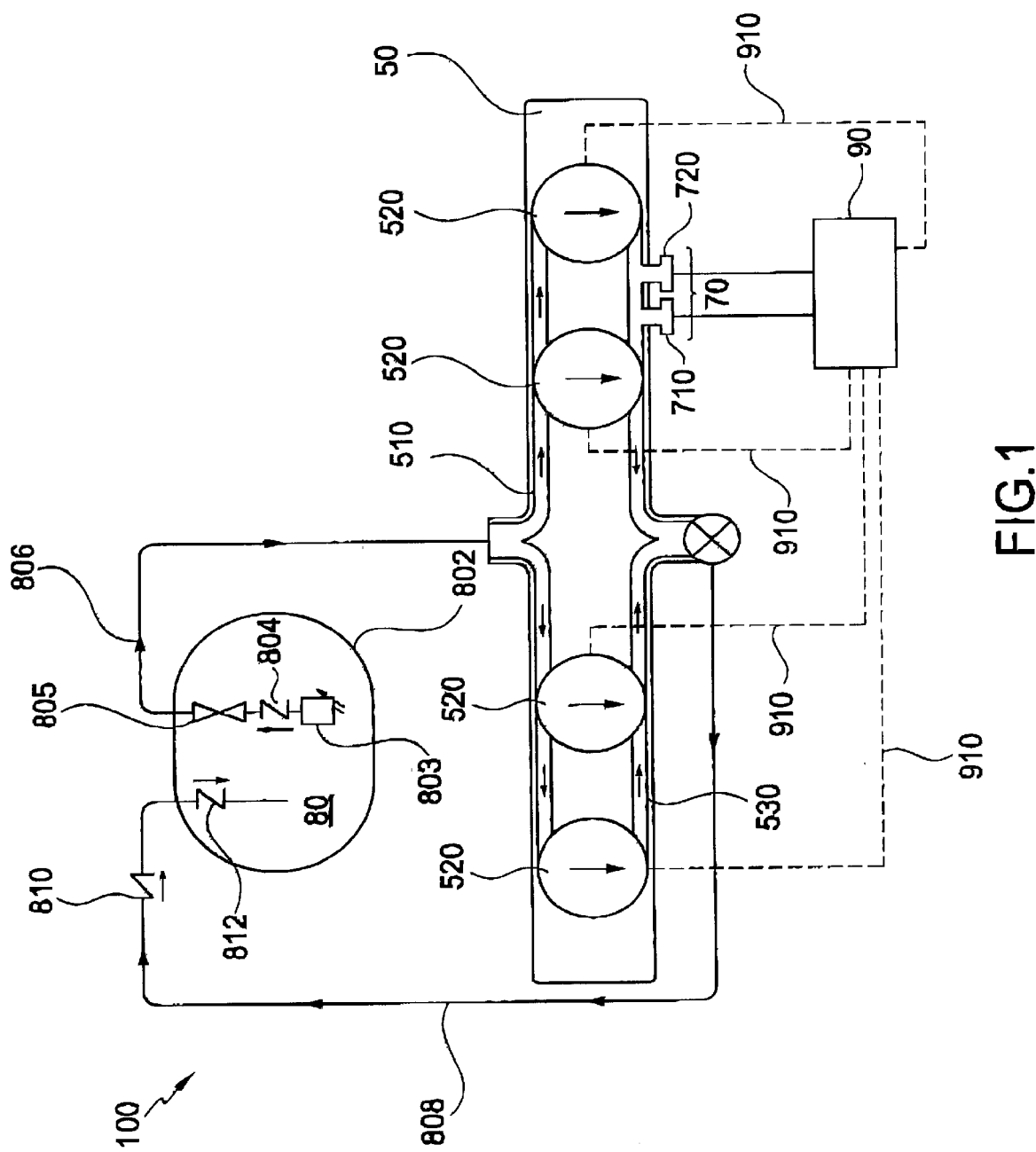
FIG. 1 is a schematic drawing of a first preferred embodiment of the present invention.

Reference is made to U.S. Pat. No. 6,035,837, which is incorporated herein by reference in its entirety. A schematic drawing of a bi-fuel fuel system 10 for an internal combustion engine 50 according to a preferred embodiment is shown in FIG. 1. In the drawings, like numerals are used to indicate like elements throughout. The internal combustion engine 50 utilizes a fuel injection system, which can be either port or direct fuel injection. The internal combustion engine 50 can be used in passenger cars, trucks and heavy vehicles.

The fuel system 10 includes a single fuel supply 80 which contains a mixture of a liquid fuel, such a gasoline, and a low pressure gaseous fuel, such as propane, contained in a tank 802. The tank 802 includes a pump 803, a check valve, flow control device or other pressure regulating device 804 fluidly connected by a fuel supply line 806 to a single fuel supply rail 510. FIG. 1 shows the pressure regulating device 804 located within the tank 802, although those skilled in the art will recognize that the pressure regulating device 804 can be located anywhere along the first fuel supply line 806 before the fuel supply rail 510. The fuel supply 80 also includes a solenoid valve 805 which can be manually or automatically secured to provide positive closure between the tank 802 and the fuel supply rail 510. Since the fuel supply 80 is capable of using a mixture of gasoline and low pressure gaseous fuel, no separation of the fuels in the tank 802 or any valve is required to provide the gasoline and the low pressure gaseous fuel separately to the engine 50.

The fuel supply rail 510 fluidly connects and supplies the fuel mixture to the fuel injectors 520 mounted on the engine 50. Some of the fuel supplied to each injector 520 is used by each injector 520 for injection into each respective combustion chamber, and the remaining fuel flows to a single fuel return rail 530. The fuel return rail 530 is fluidly connected to a fuel return line 808 for return of excess fuel to the tank 802. Preferably, the fuel return rail 530 includes at least one, and preferably two thermodynamic sensors 70 for sensing thermodynamic parameters within the fuel return rail 530. Preferably, the at least one sensor 70 is a temperature sensor 710 and/or a pressure sensor 720. The sensors 70 measure parameters within the fuel return rail 530 to enable calculation of the mixture ratio which is present in the fuel return rail 530. Alternatively, the sensors 70 can be located in the fuel supply rail 510 and can sense the thermodynamic parameters in the fuel supply rail 510. Information from the sensors 70 in the form of signals is transmitted to an electronic control unit 90. The electronic control unit 90 uses the information provided by the sensors 70 to determine the quality of the fuel, i.e. the proportion of low pressure gas to gasoline. By determining the quality of the fuel, the electronic control unit 90 can determine how much of the fuel mixture and combustion air is required at each injector 520 for proper combustion. The electronic control unit 90 is electronically connected to each fuel injector 520 via a control line 910 which transmits signals generated by the electronic control unit 90 to control the operation of each of the fuel injectors 520.

A first return check valve 810 is located in the fuel return line 808 prior to returning the fuel to the tank 802. Preferably, a second return check valve 812 is located in the tank 802, although those skilled in the art will recognize that the second return check valve 812 can be omitted.

The operation of the fuel system 10 will now be described. To supply fuel from the tank 802, the solenoid valve 805 is opened and the pump 803 is turned on. The fuel supply 80 is pumped through the fuel supply line 806 to the fuel supply rail 510. The fuel supply 80 is distributed to the injectors 520 for injection into the engine 50. At least some of the fuel supplied to the fuel injectors 520 is injected by the fuel injectors 520 into the engine 50. The sensors 70 in the fuel return rail 530 measure at least one of the temperature and pressure of the fuel supply 80 in the fuel return rail 530 and send the sensed thermodynamic parameters in the form of a quality signal to the electronic control unit 90 which determines the quality of fuel and, based on the quality, automatically adjusts the operation of the fuel injectors 520 and the combustion air supply (not shown) by sending a control signal to each of the fuel injectors 520 and to the combustion air supply (not shown) to provide a desired air/fuel ratio for combustion. Fuel which is supplied to, but not used by the fuel injectors 520 flows to the fuel return rail 530. The fuel in the fuel return rail 530 flows through the fuel return line 808, through the check valves 810 and 812, and back to the tank 802.

Operation of the system 100 is performed without purging either the gasoline or the low pressure gaseous fuel, and allows operation with only gasoline, only low pressure gaseous fuel, or a combination of both the gasoline and the low pressure gaseous fuel.

It will be appreciated by those skilled in the art that changes could be made to the embodiments described above without departing from the broad inventive concept thereof. It is understood, therefore, that this invention is not limited to the particular embodiment disclosed, but it is intended to cover modifications within the spirit and scope of the present invention as defined in the appended claims.

What is claimed is:

1. A multi-fuel system for an internal combustion engine having a plurality of combustion chambers, the multi-fuel system comprising:
   a multi-fuel tank adapted to receive one of a liquid fuel, a low pressure gaseous fuel or a mixture thereof that forms a fuel mixture in the multi-fuel tank;
   a fuel supply rail adapted to receive the liquid fuel, the low pressure gaseous fuel or the mixture thereof from the fuel tank;
   a fuel injector fluidly connecting the fuel supply rail to each of the plurality of combustion chambers so that the combustion chamber operates with only one of the liquid fuel, the low pressure gaseous fuel or a mixture thereof, wherein the fuel mixture is provided to each fuel injector for injection into each respective combustion chamber.

2. The fuel system according to claim 1, further comprising a single fuel return rail fluidly connecting each fuel injector to the fuel tank.

3. The fuel system according to claim 2, further comprising at least one thermodynamic sensor fluidly connected to at least one of the fuel supply rail and the fuel return rail, the at least one thermodynamic sensor providing a signal to an electronic control unit.

4. The fuel system according to claim 3, wherein the electronic control unit controls operation of each fuel injector.

5. The fuel system according to claim 3, wherein the at least one thermodynamic sensor comprises at least one of a temperature sensor and a pressure sensor.

6. A multi-fuel system for an internal combustion engine having a plurality of combustion chambers, the multi-fuel system comprising:
   means for receiving one of a liquid fuel, a low pressure gaseous fuel or a mixture thereof;
   means for delivering one of the liquid fuel, the low pressure gaseous fuel or the mixture thereof from the multi-fuel tank; and
   means for injecting one of the liquid fuel, the low pressure gaseous fuel or the mixture thereof to each of the plurality of combustion chambers so that each of combustion chambers operates with only one of the liquid fuel, the low pressure gaseous fuel or a mixture thereof.

7. The fuel system according to claim 6, further comprising a single fuel return rail fluidly connecting each fuel injector to the fuel tank.

8. The fuel system according to claim 7, further comprising at least one thermodynamic sensor fluidly connected to at least one of the means for delivering and the fuel return rail, the at least one thermodynamic sensor providing a signal to an electronic control unit.

9. The fuel system according to claim 8, wherein the electronic control unit controls operation of the means for injecting.

10. The fuel system according to claim 8, wherein the at least one thermodynamic sensor comprises at least one of a temperature sensor and a pressure sensor.

11. A method of operating a multi-fuel system comprising a common fuel tank, a fuel supply rail, a plurality of fuel injectors, each fuel injector being coupled to a combustion chamber of an internal combustion engine and a single fuel return rail, the method comprising:
    receiving one of a liquid fuel, a low pressure gaseous fuel or a mixture thereof in the common fuel tank;
    delivering fuel having one of the liquid fuel, low pressure gaseous fuel or mixture thereof from the common fuel tank through the fuel supply rail to a plurality of fuel injectors;
    delivering at least part of the fuel from the common fuel tank into each of the plurality of fuel injectors such that the combustion chamber operates with only one of the liquid fuel, the low pressure gaseous fuel or a mixture thereof;
    delivering a remaining part of the fuel to a single fuel return rail; and
    returning the remaining part of the fuel to the common tank.

12. The method according to claim 11, further comprising:
    measuring a quality of the fuel and sending a quality signal corresponding to a quality of the fuel to an electronic control unit.

13. The method according to claim 12, further comprising sending a control signal to each of the fuel injectors based on the quality signal.

14. The method according to claim 12, wherein measuring the quality comprises measuring at least one of temperature and pressure of the fuel.

* * * * *